United States Patent

Nakatsugawa

[11] Patent Number: 6,131,124
[45] Date of Patent: Oct. 10, 2000

[54] DATA COMMUNICATION METHOD AND DATA COMMUNICATION SYSTEM USING THIS METHOD

[75] Inventor: Yoshinori Nakatsugawa, Susono, Japan

[73] Assignee: Yazaki Corporation, Tokyo, Japan

[21] Appl. No.: 09/028,093

[22] Filed: Feb. 23, 1998

[30] Foreign Application Priority Data

Feb. 24, 1997 [JP] Japan .................................. 9-039333

[51] Int. Cl.$^7$ ................................................. G06F 15/16
[52] U.S. Cl. .................. 709/245; 709/238; 709/242; 709/240
[58] Field of Search .................. 709/238, 242, 709/245, 240

[56] References Cited

U.S. PATENT DOCUMENTS

| | | | |
|---|---|---|---|
| 5,347,272 | 9/1994 | Ota | 370/392 |
| 5,585,854 | 12/1996 | Makino | 358/407 |
| 5,701,417 | 12/1997 | Lewis et al. | 709/245 |
| 5,751,954 | 5/1998 | Saito | 709/238 |
| 5,761,440 | 6/1998 | De Marco et al. | 709/245 |
| 5,862,344 | 1/1999 | Hart | 709/238 |

FOREIGN PATENT DOCUMENTS

| | | |
|---|---|---|
| 0 406 486 A1 | 1/1991 | European Pat. Off. . |
| 61-2451 | 1/1986 | Japan . |
| 63-283334 | 11/1988 | Japan . |
| 3-44294 | 2/1991 | Japan . |
| 3-65703 | 10/1991 | Japan . |
| 5-284165 | 10/1993 | Japan . |
| 6-81142 | 10/1994 | Japan . |

*Primary Examiner*—Zarni Maung
*Assistant Examiner*—Debbie M. Le
*Attorney, Agent, or Firm*—Oblon, Spivak, McClelland, Maier & Neustadt, P.C.

[57] ABSTRACT

At relay units, route addresses which are included in packet data and are constructed by aligning addresses of the relay units existing at branch points in communication routes in passing order are decoded, then appropriate routes as a destination of the packet data are selected based on the decoded route addresses and own address stored previously, and then the packet data are transmitted to node terminals designated as the destination via the selected routes, whereby the packet data can be transmitted to a node terminal as the destination via the designated relay units.

7 Claims, 6 Drawing Sheets

DATA FORMAT WHEN DATA ARE TRANSMITTED FROM N5 TO N11

DATA COMMUNICATION METHOD AND DATA COMMUNICATION SYSTEM USING THIS METHOD

BACKGROUND OF THE INVENTION

1. Field of the Invention

The present invention relates to a data communication method used for executing data exchange between different networks by connecting a plurality of networks via relay units including gate ways, route hubs, or hubs mutually, and a data communication system using this communication method. More particularly, the present invention relates to a data communication method capable of surely transmitting communication data to a designated destination node terminal without a reduction in data transmission capacity per unit time, even when data exchange is executed between the different networks with the intervention of one or more than two networks in communication routes and also data communication routes branch out into plural routes with the travel of communication data, and a data communication system using this communication method.

2. Description of the Prior Art

In the prior art, as disclosed in Patent Application Publication (KOKAI) 59-62245, for example, a data communication system has been widely known in which a plurality of local area networks (referred to as "LAN's" hereinafter) used to execute data exchange between a plurality of stations are connected via gate ways to enable data exchange between LANs.

According to the technology disclosed in the above Publication, in addition to a transmitter/receiver address for designating the transmitter and the receiver of data respectively, a transmitting or receiving station address indicating the data transmitting or receiving station and a network address indicating the network to which the data transmitting or receiving station belongs have been provided in the transmitter/receiver address of the communication data. Hence, even if data communication is to be carried out beyond its own network, certain data communication between different LAN's has been made possible by referring to these addresses upon data communication.

However, according to the addressing approach used in the above data communication system in the prior art, the network address designated as the destination and the network address peculiar to the LAN in which the communication data reside are compared with each other and then it is determined timely whether or not the communication data reach the destination LAN based on the result that these addresses coincide with each other or not. For this reason, at the time when the data communication is enabled between LAN's with the intervention of one or more than two LAN's in the communication routes, for example, if data communication routes branch out into plural routes with the travel of communication data, it has not been able to be decided which branch route the communication data is to be supplied to, so that the communication data have reached the destination LAN while making a detour on the route. As a result, in the above data communication system in the prior art, such problem to be overcome has resided that it is difficult to increase data transmission capacity per unit time.

SUMMARY OF THE INVENTION

The present invention has been made in light of the above circumstances, and it is an object of the present invention to provide a data communication method which is able to transmit communication data surely to a designated destination node terminal without a reduction in data transmission capacity per unit time, even when data exchange is executed between a plurality of networks with the intervention of one or more than two networks in communication routes and also data communication routes branch out into plural routes with the travel of communication data, by providing an addressing area in a data area of the communication data serving as a transmission object and then writing previously in this addressing area route addresses which are constructed by arranging their own addresses of relay units positioned at branch points in the communication routes in passing order, and a data communication system using this communication method.

In order to achieve the above object of the present invention, according to an aspect of the present invention, there is provided a data communication method used to execute data exchange between a plurality of networks which are connected via relay units mutually and to which node terminals are connected respectively, comprising the steps of: writing previously route addresses into an addressing area of a data area of communication data serving as a transmission object, the route addresses being constructed by aligning in passing order addresses of the relay units which exist at branch points in communication routes; decoding the route addresses included in the communication data transmitted from a node terminal by the relay units; and selecting appropriate routes as a destination of the communication data by the relay units based on the decoded route addresses and own address stored previously, so as to transmit the communication data to a node terminal designated as the destination via the selected routes.

According to the present invention, the relay units can decode the route addresses which are included in the communication data transmitted from the node terminal, then select appropriate routes as the destination of the communication data based on the decoded route addresses and the own address stored previously, and then transmit the communication data to the node terminal designated as the destination via the selected routes. Therefore, even if data exchange is executed between a plurality of networks with the intervention of one or more than two networks in communication routes and also data communication routes branch out into plural routes with the travel of communication data, communication data can be transmitted surely to a designated node terminal as the destination without a reduction in data transmission capacity per unit time.

In the preferred embodiment of the present invention, the appropriate routes selecting step comprises the steps of: comparing/deciding by the relay units whether or not the own address is included in the decoded route addresses; and selecting appropriate routes as the destination of the communication data by the relay units based on comparison/decision result.

According to this embodiment, the relay units can compare and decide whether or not the own address is included in the route addresses.

In the preferred embodiment of the present invention, the appropriate routes selecting step comprises the step of: selecting routes of own network as the destination of the communication data by the relay units if it is decided as the comparison/decision result that the own address is not included in the route addresses, so as to transmit the communication data to the node terminal designated as the destination via the selected routes of the own network.

According to this embodiment, as the comparison/decision result, if the relay units have decided that the own address is not included in the route addresses, they can select routes of own network as the destination of the communication data and then transmit the communication data to the node terminal designated as the destination via the selected routes of the own network.

In the preferred embodiment of the present invention, the appropriate routes selecting step comprises the step of: selecting routes of other network as the destination of the communication data by the relay units if it is decided as the comparison/decision result that the own address is included in the route addresses, so as to transmit the communication data to the node terminal designated as the destination via the selected routes of other network.

According to this embodiment, as the comparison/decision result, if the relay units have decided that the own address is included in the route addresses, they can select routes of other network as the destination of the communication data and then transmit the communication data to the node terminal designated as the destination via the selected routes of other network.

In the preferred embodiment of the present invention, the appropriate routes selecting step comprises the step of: selecting routes to pass through the communication data by the relay units if it is decided as the comparison/decision result that the own address is not included in the route addresses, so as to transmit the communication data to the node terminal designated as the destination via the selected routes.

According to this embodiment, as the comparison/decision result, if the relay units have decided that the own address is included in the route addresses, they can select routes to pass through the communication data by the relay units and then transmit the communication data to the node terminal designated as the destination via the selected routes.

In the preferred embodiment of the present invention, the appropriate routes selecting step comprises the step of: transmitting by the relay units the communication data to the node terminals which are designated as the destination and connected to the own network if it is decided as the comparison/decision result that the own address is included in the route addresses and also the own address is recognized as a terminal address in the route addresses.

According to this embodiment, as the comparison/decision result, if the relay units have decided that the own address is included in the route addresses and that the own address is recognized as a terminal address in the route addresses, they can transmit the communication data to the node terminals which are designated as the destination and connected to the own network.

In order to achieve the above object of the present invention, according to another aspect of the present invention, there is provided a data communication system for executing data exchange between a plurality of networks which are connected via relay units mutually and to which node terminals are connected respectively, each of the relay units comprising: decoding means for decoding route addresses which are written previously into an addressing area of a data area of communication data transmitted from the node terminal, the route addresses being constructed by aligning in passing order addresses of the relay units which exist at branch points in communication routes; address storing means for storing own address; comparing/deciding means for deciding by comparison whether or not the own address stored in the address storing means is included in the route addresses decoded by the decoding means; and route selecting means for selecting appropriate routes as a destination of the communication data based on comparison/decision result obtained by the comparing/deciding means and then transmitting the communication data to node terminals designated as the destination via the selected routes.

According to the present invention, at first the decoding means can decode route addresses which are written previously into an addressing area of a data area of communication data transmitted from the node terminal and which are constructed by aligning in passing order addresses of the relay units which exist at branch points in communication routes. Then, the comparing/deciding means can compare and decide whether or not the own address stored in the address storing means is included in the route addresses decoded by the decoding means. Then, the route selecting means can select appropriate routes as a destination of the communication data based on comparison/decision result obtained by the comparing/deciding means and then transmit the communication data to node terminals designated as the destination via the selected routes. Therefore, even if data exchange is executed between a plurality of networks with the intervention of one or more than two networks in communication routes and also data communication routes branch out into plural routes with the travel of communication data, communication data can be transmitted surely to a designated node terminal as the destination without a reduction in data transmission capacity per unit time.

The nature, principle and utility of the invention will become more apparent from the following detailed description when read in conjunction with the accompanying drawings.

DESCRIPTION OF THE PREFERRED EMBODIMENTS

A data communication method and a data communication system using this method according to embodiments of the present invention will be explained in detail with reference to the accompanying drawings hereinafter.

Figure 1:
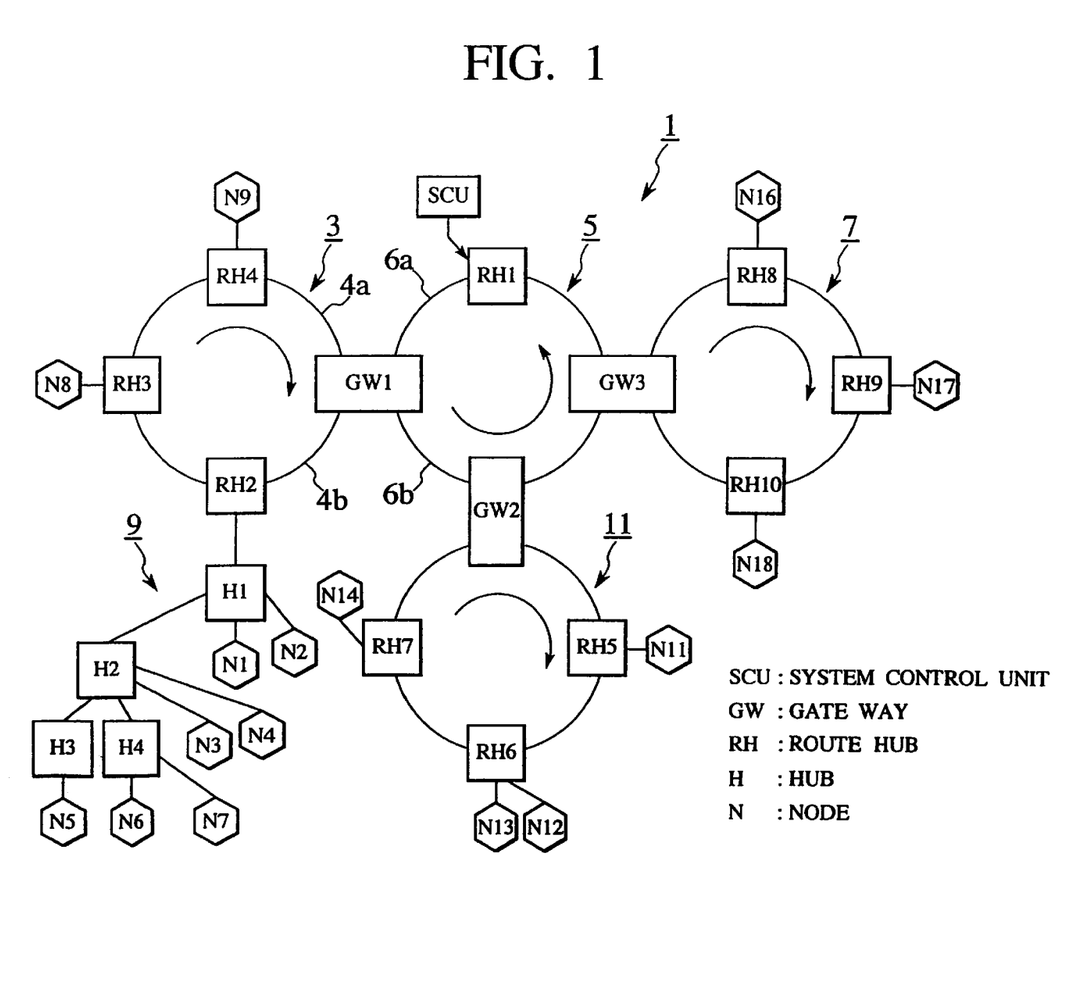
FIG. 1 is a schematic block circuit diagram showing a configuration of a data communication system according to the present invention.

First, as shown in FIG. 1, a data communication system 1 of the present invention is constructed by connecting first to fourth LAN's 3, 5, 7, 11, each being formed by connecting plural route hubs RH by means of loop data transmission lines mutually, via first to third gate ways GW1, GW2, GW3 mutually data-interchangeably and also connecting a multi-layered tree 9 including a plurality of hubs H to a route hub RH2 which belongs to the first LAN 3. As a network topology for the first to fourth LAN's 3, 5, 7, 11, bus type, star type, etc., for example, may be employed appropriately other than the above loop type.

One or two node terminals N or more are connected to a plurality of route hubs RH except for route hubs RH1, RH2 or a plurality of hubs H respectively. In addition, as shown in FIG. 1, individual inherent addresses such as RH1, RH2, RH3, . . . , for example, are allocated previously to the route hubs RH, the hubs H, and the node terminals N respectively. The addresses which are allocated to the node terminals N out of these addresses are used to designate the node terminals N serving as the source or destination, whereas the addresses which are allocated to the route hubs RH or the hubs H are used to designate routes of the communication data in route addresses. Such route addresses are constructed by arranging addresses of relay units positioned at branch points in the communication routes in their passing order. If the data communication system according to the present invention is applied to the vehicle communication system, for example, which enables to exchange various data such as digital audio data mutually, appropriate devices such as a vehicle-equipped personal computer, a portable telephone, a DVD-ROM drive, a digital TV, a CD-ROM drive, a navigation system, a radio receiver, a speaker, etc. may be employed as the node terminals N.

The first to third gate ways GW1, GW2, GW3 have a protocol conversion function and a route selection function respectively. According to such protocol conversion function, a protocol conversion can be executed to accommodate packet data to protocols of neighboring LAN's, and then the converted packet data can be sent out to the neighboring LAN's. Such packet data are sent out from either the node terminals N belonging to the first to fourth LAN's 3, 5, 7, 11 respectively or the node terminals N belonging to the multi-layered tree 9. According to such route selection function, the route addresses which are allocated to the packet data sent out from either of the node terminals N can be decoded, then appropriate routes as the packet data source can be selected based on the decoded route address, and then the packet data can be sent out to the selected route.

As shown in FIG. 1, the individual inherent addresses like GW1, GW2, GW3, for example, are allocated in advance to the first to third gate ways GW1, GW2, GW3 respectively. Like the addresses allocated to the route hubs RH or the hubs H, these addresses are used to designate the routes of the communication data in the route addresses to be described later.

Figure 2:
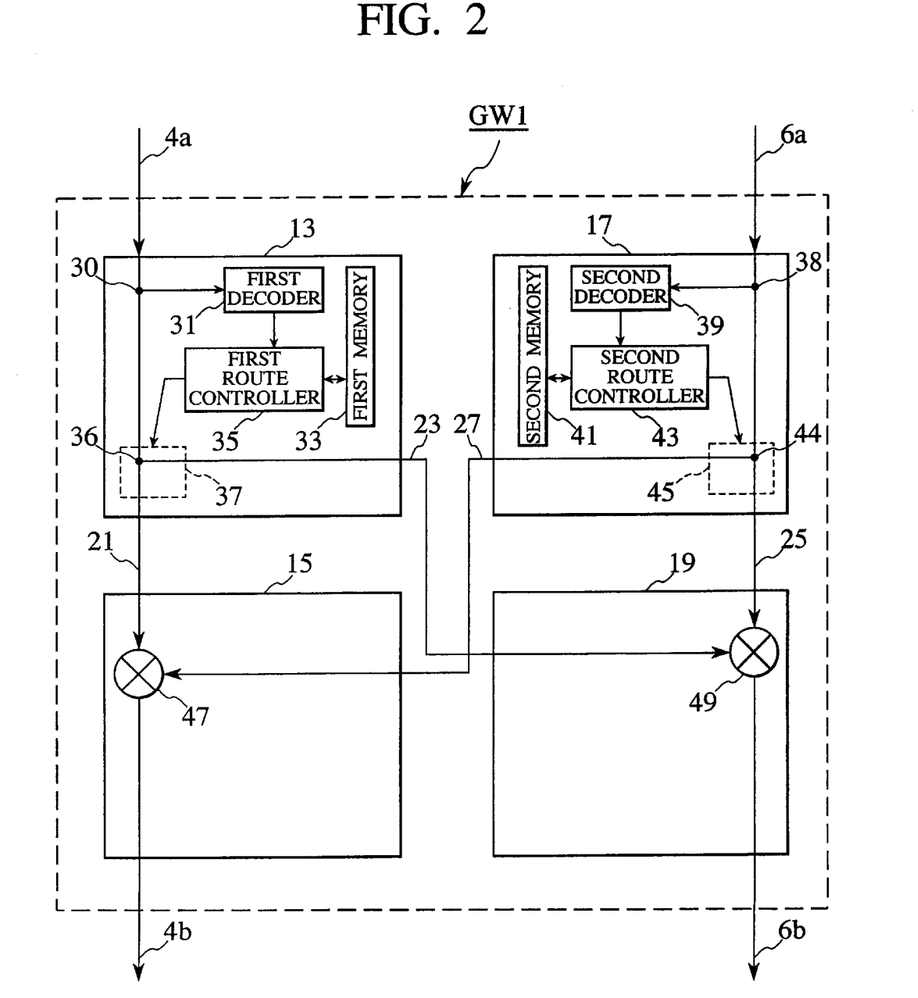
FIG. 2 is a block circuit diagram showing a gate way shown in FIG. 1.

In more detail, as shown in FIG. 2, for example, the first gate way GW1 comprises a first distributor 13 and a second distributor 17, and a first mixer 15 and a second mixer 19. More specifically, each of the first distributor 13 and the second distributor 17 can always monitor the presence of the packet data which are passing through the first gate way GW1, then decode the route addresses allocated to the packet data when passing of the packet data can be detected, then select the appropriate route as the destination of the packet data based on the decoded route addresses, and then switch the data transfer destination to the selected route. The first mixer 15 and the second mixer 19 can send out the packet data to the data transfer destinations which are switched by the first distributor 13 and the second distributor 17 respectively.

In addition, the first distributor 13 comprises a first decoder 31, a first memory 33, a first route controller 35, and a first route switcher 37. Similarly, the second distributor 17 comprises a second decoder 39, a second memory 41, a second route controller 43, and a second route switcher 45. More particularly, the first decoder 31 and the second decoder 39 are connected to a first branch point 30 and a second branch point 38 to branch off from input side data transfer lines 4a, 6a respectively. Also, the first decoder 31 and the second decoder 39 can always monitor the presence of the packet data which are passing through the first gate way GW1, and then decode the route addresses allocated to the packet data when the passing of the packet data can be detected respectively. Then, the first memory 33 and the second memory 41 can store the address GW1 of the first gate way respectively. Then, the first route controller 35 and the second route controller 43 can decide whether or not the address GW1 of the first gate way stored in the first memory 33 and the second memory 41 is included in the route addresses decoded by the first decoder 31 and the second decoder 39 respectively, and then select the appropriate route as the destination of the packet data based on this decision result respectively. Then, the first route switcher 37 and the second route switcher 45 can switch the data transfer destination to the selected routes out of a pair of routes 21, 23 or a pair of routes 25, 27 which are connected to a third branch point 36 and a fourth branch point 44 respectively.

Further, the first mixer 15 and the second mixer 19 comprise a first multiplexer 47 and a second multiplexer 49 respectively. The first multiplexer 47 and the second multiplexer 49 can packet-multiplex the packet data of the mutual neighboring LAN's when the packet data are sent out onto the selected route, and then send out multiplexed packet data to output side data transfer lines 4b, 6b respectively.

An internal configuration of the gate way GW has been explained while taking the gate way GW1 as an example. Similarly, the internal configurations of the gate ways GW2, GW3 are identical to that of the gate way GW1 and therefore their description will be omitted herein.

Figure 3:
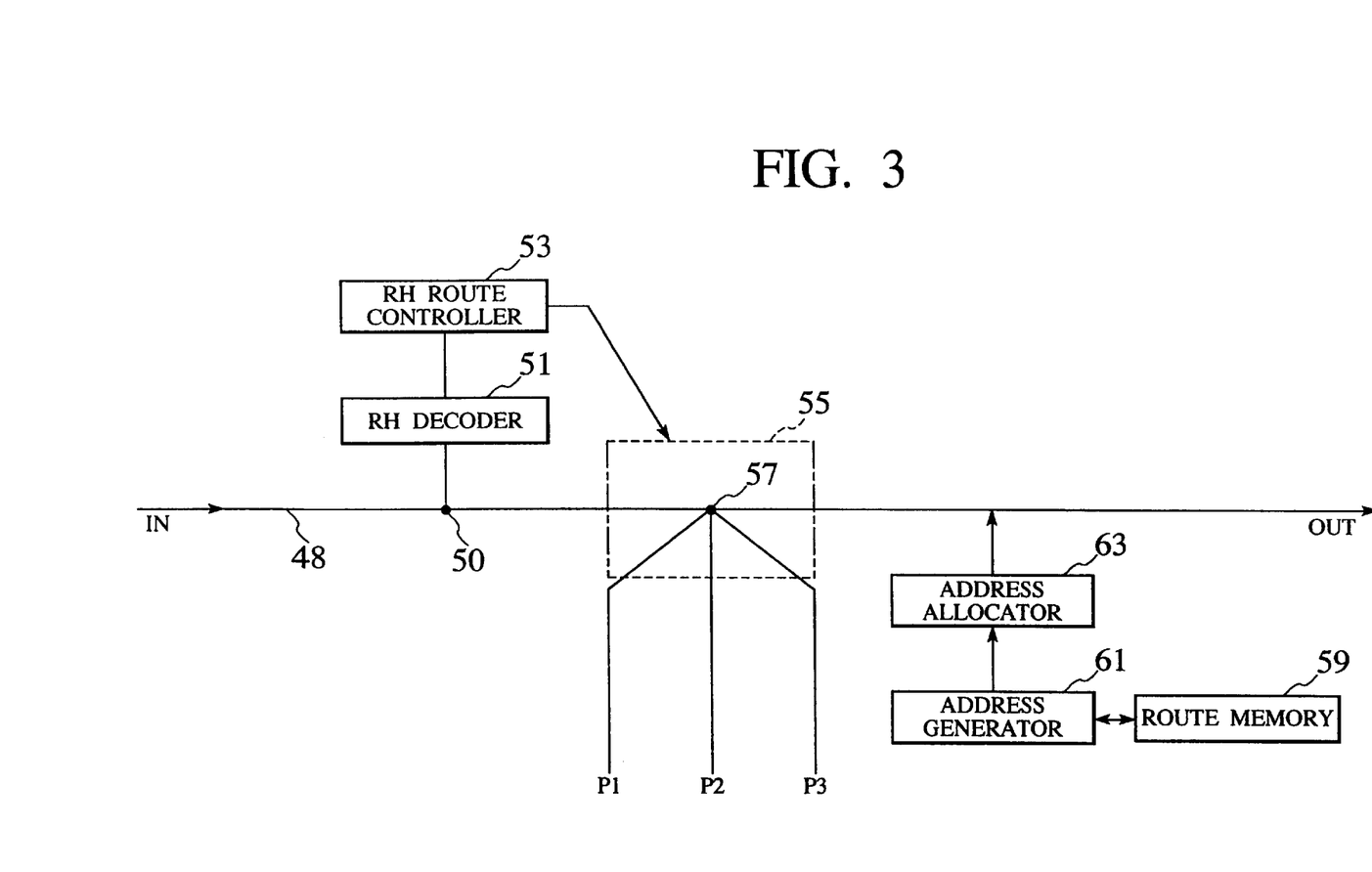
FIG. 3 is a block circuit diagram showing a route hub shown in FIG. 1.

In turn, internal configurations of the route hub RH and the hub H will be explained hereunder to take the route hub RH3 as an example, for example. As shown in FIG. 3, the route hub RH 3 comprises an RH decoder 51, an RH route controller 53, an RH route switcher 55, a route memory 59, an address generator 61, and an address allocator 63. More particularly, the RH decoder 51 is connected to a fifth branch point 50 to branch off from an RH data transfer line 48. Also, the RH decoder 51 can always monitor the presence of the packet data which are passing through the route hub RH3, and then decode the route addresses allocated to the packet data when the passing of the packet data can be detected. Then, the RH route controller 53 can decide whether or not the address of the route hub RH3 is included in the route addresses decoded by the RH decoder 51, and then select the appropriate route as the destination of the packet data based on this decision result. Then, the RH route switcher 55 can switch the data transfer destination to the selected route out of three connection terminals P1, P2, P3 such as the node terminals N which are connected to a sixth branch point 57 in the RH data transfer line 48 respectively, and then send out the packet data onto the RH data transfer lines 48 along the predetermined direction via the sixth branch point 57 when the packet data are sent out from the node terminal N8 (P1). Then, the route memory 59 can store route information concerning the route addresses which correspond to a plurality of destinations of the packet data sent out from the node terminal N8 respectively. Then, the address generator 61 can generate source/destination addresses, and generate the route address which corresponds to the destination of the packet data based on both the destination of the packet data sent out from the node terminal N8 and route information stored in the route memory 59. Then, the address allocator 63 can allocate the source/destination addresses and the route address generated by the address generator 61 to the packet data serving as the transmission object. When the node terminal N is connected to the route hub RH and then the packet data are sent out from the connected node terminal N, such address allocation is carried out by the address allocator 63.

Respective internal configurations of the route hubs RH or the hubs H have been explained while taking the route hub RH3 as an example. Similarly, since the internal configurations of the route hubs RH or the hubs H other than the route hub RH3 are the same as that of the route hub RH, their description will be omitted herein.

Subsequently, while taking the node terminal N5 belonging to the multi-layered tree 9 as the source and the node terminal N11 belonging to the fourth LAN 11 as the destination, an operation of the data communication system constructed as above according to the present invention will be explained hereunder.

Figure 5:
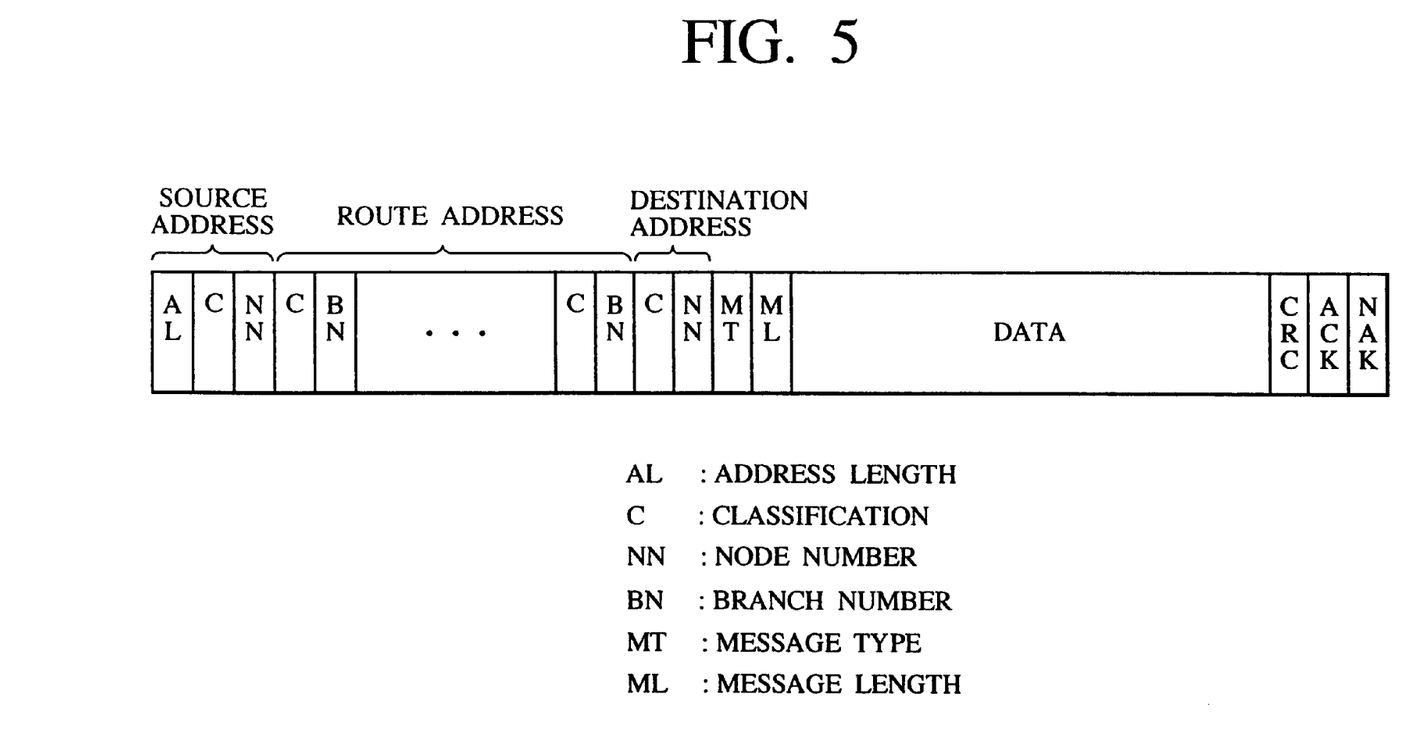
FIG. 5 is a view showing a format of header information of packet data.
Figure 6:
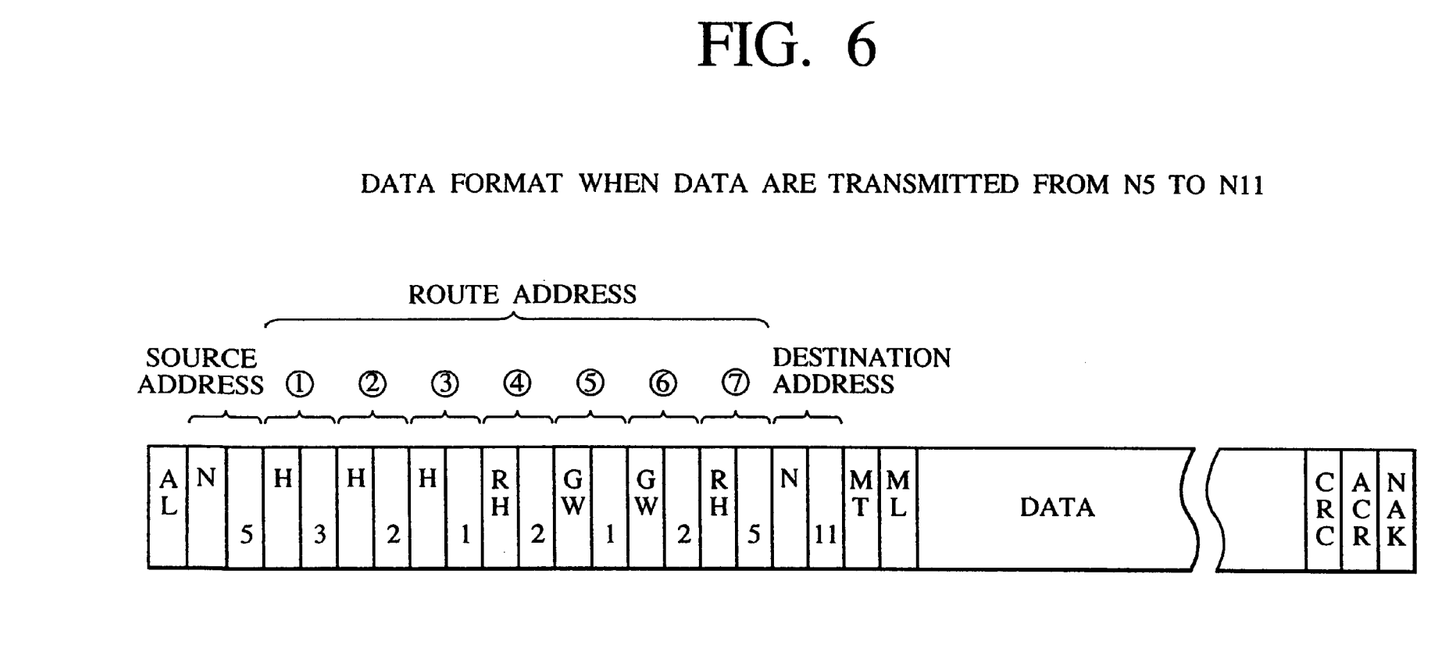
FIG. 6 is a concrete example of the header information of the packet data.

When the packet data as the transmission object are sent out from the node terminal N5, the address generator 61 in the hub H3 generates the source/destination addresses, then reads the route address which corresponds to the destination of the packet data from the route information stored in the route memory 59, and then generates the route address corresponding to the destination of the packet data. Then, the address allocator 63 allocates the source/destination addresses and the route address generated by the address generator 61 to the packet data, and then sends out to the data transfer line the packet data to which header information including the source/destination addresses and the route address are allocated. According to a format shown in FIG. 5, for example, header information to be allocated to the packet data can be arranged as shown in FIG. 6. In other words, addresses of the relay units including the hubs H, the route hubs RH, and the gate ways GW, which are positioned at the branch points of the communication routes of the packet data transmitted from the source, are set in a route address area such that they are aligned in due order from the source to the destination.

Figure 4:
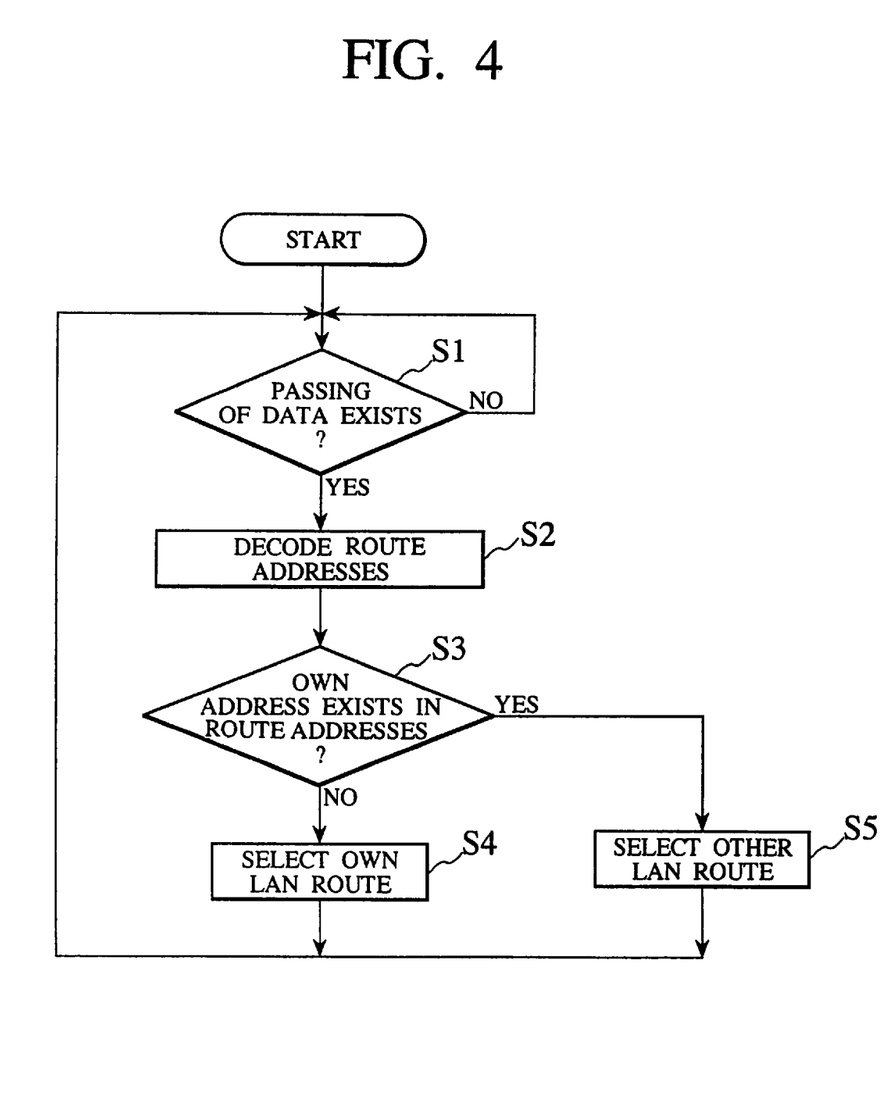
FIG. 4 is a flowchart illustrating operational procedures of the gate way shown in FIG. 1.

Next, operational procedures of the first gate way GW1 which resides in the communication route of the packet data transmitted from the node terminal N5 will be explained along with a flowchart shown in FIG. 4.

At first, the first decoder 31 of the first gate way GW1 always monitors whether or not the packet data which are passing through the first gate way GW1 exists (step S1). Then, if passing of the packet data exists, a process of decoding the route addresses allocated to the packet data is carried out (step S2).

In response to the route addresses decoded by step S2, the first route controller 35 decides by comparison whether or not the address GW1 of the first gate way stored in the first memory 33, i.e., own address, is included in the route addresses decoded by the first decoder 31 (step S3). Then, the first route controller 35 selects the appropriate route as the destination of the packet data based on this decision result.

More specifically, as the result of decision in step S3, unless own address of the first gate way GW1 is included in the route addresses, the first route controller 35 selects own LAN route 21 as the destination of the packet data (step S4). Following to this selection, the first route switcher 37 switches the data transfer destination to the selected own LAN route 21, and then sends out the packet data to the output side data transfer line 4b via the first multiplexer 47. Consequently, the packet data can circulate around the first LAN 3.

In contrast, as the result of decision in step S3, if own address of the first gate way GW1 is included in the route addresses, the first route controller 35 selects other LAN route 23 as the destination of the packet data (step S4). Following to this selection, the first route switcher 37 switches the data transfer destination to the selected other LAN route 23, and then sends out the packet data to the second multiplexer 49. The second multiplexer 49 then packet-multiplexes the packet data of the second LAN 5 to which the second multiplexer 49 belongs and the packet data of the first LAN 3, and then sends out the multiplexed packet data to the output side data transfer line 6b. Consequently, the packet data can be transferred from the first LAN 3 to the second LAN 5.

In addition, an operation of the route hub RH5 to which the destination node terminal N11 of the packet data transmitted from the node terminal N5 is connected will be explained hereinbelow.

First, the RH decoder 51 in the route hub RH5 always monitors the presence of the packet data which is passing through the route hub RH5, and then decodes the route address allocated to the packet data when the passing of the packet data can be detected. The RH route controller 53 then determines whether or not the address of the route hub RH5 is included in the route addresses decoded by the RH decoder 51. Based on this decision result, the RH route controller 53 then selects an appropriate route as the destination of the packet data.

In other words, unless the address of the route hub RH5 is included in the route addresses, the route to pass through the packet data is selected. On the contrary, if the address of the route hub RH5 is included in the route addresses, the route for designating a succeeding address is selected as the communication destination. Such succeeding address is placed next to the address of the route hub RH5 which is aligned in the route addresses. In the case of the relay unit where the route hub RH5 acts as a terminal unit, the succeeding address does not exist in the route addresses. In this event, the route which is selected to the destination node terminal N11 designated by the destination address can be selected. Accordingly, the packet data transmitted from the node terminal N5 can be received by the node terminal N11.

In this fashion, an addressing area is provided in a data area of the communication data serving as a transmission object, then the route addresses which are constructed by arranging the source/destination addresses and their own addresses of relay units positioned at branch points in the communication routes in passing order are written previously in this addressing area, then the route addresses are decoded in the relay units, then appropriate route is selected as the destination of the packet data based on the decoded route addresses and own address of the relay unit stored previously, and the packet data are sent out to the selected route, whereby the packet data can be sent out to the destination node terminal via the designated relay units. As a consequence, even when data exchange is executed between plural networks with the intervention of one or more than two networks in communication routes and also data communication routes branch out into plural routes with the travel of communication data, the communication data can be transmitted firmly to the designated destination node terminal without the reduction in data transmission capacity per unit time.

It should be understood that many modifications and adaptations of the invention will become apparent to those skilled in the art and it is intended to encompass such obvious modifications and changes in the scope of the claims appended hereto.

What is claimed is:

1. A data communication method used to execute data exchange between a plurality of networks which are connected via relay units mutually and to which node terminals are connected respectively, comprising the steps of:

writing predefined route addresses into an addressing area of a data area of communication data serving as a transmission object, the route addresses being constructed by aligning in passing order addresses of the relay units which exist at branch points in communication routes;

decoding the route addresses included in the communication data transmitted from a node terminal by the relay units; and selecting appropriate routes as a destination of the communication data by the relay units based on the decoded route addresses and own address stored previously, so as to transmit the communication date to anode terminal designated as the destination via the selected routes.

2. A data communication method according to claim 1, wherein the appropriate routes selecting step comprises the steps of:

comparing/deciding by the relay units whether or not the own address is included in the decoded route addresses; and selecting the appropriate routes as the destination of the communication data by the relay units based on comparison/decision result.

3. A data communication method according to claim 2, wherein the appropriate routes selecting step comprises the step of:

selecting routes of own network as the destination of the communication data by the relay units if it is decided as the comparison/decision result that the own address is not included in the route addresses, so as to transmit the communication data to the node terminal designated as the destination via the selected routes of the own network.

4. A data communication method according to claim 2, wherein the appropriate routes selecting step comprises the step of:

selecting routes of other network as the destination of the communication data by the relay units if it is decided as the comparison/decision result that the own address is included in the route addresses, so as to transmit the communication data to the node terminal designated as the destination via the selected routes of the other network.

5. A data communication method according to claim 2, wherein the appropriate routes selecting step comprises the step of:

selecting routes to pass through the communication data by the relay units if it is decided as the comparison/decision result that the own address is not included in the route addresses, so as to transmit the communication data to the node terminal designated as the destination via the selected routes.

6. A data communication method according to claim 2, wherein the appropriate routes selecting step comprises the step of:

transmitting by the relay units the communication data to the node terminals which are designated as the destination and connected to the own network if it is decided as the comparison/decision result that the own address is included in the route addresses and also the own address is recognized as a terminal address in the route addresses.

7. In a data communication system for executing data exchange between a plurality of networks which are connected via relay units mutually and to which node terminals are connected respectively, each of the relay units comprising:

decoding means for decoding predefined route addresses which are written into an addressing area of a data area of communication data transmitted from the node terminal, the route addresses being constructed by aligning in passing order addresses of the relay units which exist at branch points in communication routes;

address storing means for storing own address;

comparing/deciding means for deciding by comparison whether or not the own address stored in the address storing means is included in the route addresses decoded by the decoding means; and route selecting means for selecting appropriate routes as a destination of the communication data based on comparison/decision result obtained by the comparing/deciding means and then transmitting the communication data to node terminals designated as the destination via the selected routes.

* * * * *